United States Patent
Liu

(10) Patent No.: US 10,945,914 B1
(45) Date of Patent: Mar. 16, 2021

(54) ACCESSORY FOR ADULT TOY, AND SYSTEM AND METHOD FOR PROVIDING ADULT ENTERTAINMENT IMPLEMENTING ADULT TOY

(71) Applicant: DANXIAO INFORMATION TECHNOLOGY LTD., Guangzhou (CN)

(72) Inventor: Dan Liu, Guangzhou (CN)

(73) Assignee: Danxiao Information Technology Ltd., Guangzhao (CN)

( * ) Notice: Subject to any disclaimer, the term of this patent is extended or adjusted under 35 U.S.C. 154(b) by 0 days.

(21) Appl. No.: 16/538,825

(22) Filed: Aug. 13, 2019

(51) Int. Cl.
  *A61H 19/00* (2006.01)
  *G06Q 20/12* (2012.01)
  *G06Q 20/06* (2012.01)

(52) U.S. Cl.
  CPC ........... *A61H 19/44* (2013.01); *G06Q 20/123* (2013.01); *G06Q 20/127* (2013.01); *A61H 2201/0188* (2013.01); *A61H 2201/5012* (2013.01); *A61H 2201/5043* (2013.01); *A61H 2201/5058* (2013.01); *A61H 2201/5097* (2013.01); *G06Q 20/065* (2013.01)

(58) Field of Classification Search
  CPC ........... A61H 19/44; A61H 2201/0188; A61H 2201/5012; A61H 2201/5043; A61H 2201/5058; A61H 2201/5097; A61H 19/00; A61H 2201/5017; A61H 2201/502; A61H 2201/5023; A61H 2201/5025; A61H 2201/5041; G06Q 20/123; G06Q 20/127; G06Q 20/065

USPC .............. 340/6.1, 7.6, 407.1, 407.2; 600/38; 601/46

See application file for complete search history.

(56) References Cited

U.S. PATENT DOCUMENTS

| | | | | |
|---|---|---|---|---|
| 6,028,531 | A * | 2/2000 | Wanderlich | A61H 19/00 340/384.2 |
| 6,368,268 | B1 * | 4/2002 | Sandvick | A61H 19/44 600/38 |
| 6,409,599 | B1 * | 6/2002 | Sprout | A63F 13/08 463/31 |
| 9,050,240 | B2 | 6/2015 | Howsam | |
| 9,610,214 | B2 | 4/2017 | Zipper | |
| 9,762,515 | B1 * | 9/2017 | Olivares | H04L 51/046 |
| 10,159,622 | B2 | 12/2018 | Dills | |
| 2004/0082831 | A1 * | 4/2004 | Kobashikawa | A61H 19/44 600/38 |
| 2005/0027794 | A1 * | 2/2005 | Decker | G08C 17/00 709/201 |
| 2006/0178602 | A1 * | 8/2006 | Teng | A61H 19/34 601/70 |

(Continued)

*Primary Examiner* — Edwin C Holloway, III
(74) *Attorney, Agent, or Firm* — Kanika Radhakrishnan; Evergreen Valley Law Group

(57) ABSTRACT

An accessory for an adult toy is disclosed. Herein, the adult toy has a vibration motor and a controller configured to actuate the vibration motor by generating an actuation signal. The accessory comprise a body adapted to be mounted on the adult toy. The accessory also comprises a light source arranged inside the body. The accessory further comprises a control circuit. The control circuit is configured to control the light source upon actuation of the vibration motor by the controller. A system and a method implementing the adult toy with the accessory for providing adult entertainment are also disclosed.

17 Claims, 7 Drawing Sheets

(56) References Cited

U.S. PATENT DOCUMENTS

| | | | |
|---|---|---|---|
| 2007/0179414 A1* | 8/2007 | Imboden | H02J 50/12 |
| | | | 601/72 |
| 2010/0013610 A1* | 1/2010 | Schwieger | A61H 23/0254 |
| | | | 340/407.1 |
| 2011/0195753 A1* | 8/2011 | Mock | H04B 1/3888 |
| | | | 455/566 |
| 2012/0215141 A1* | 8/2012 | Peddicord | A61N 1/36007 |
| | | | 601/46 |
| 2014/0243591 A1* | 8/2014 | Weller | A61H 19/34 |
| | | | 600/38 |
| 2016/0008218 A1 | 1/2016 | Murison | |
| 2017/0042757 A1* | 2/2017 | Wang | A61H 19/34 |
| 2017/0087049 A1 | 3/2017 | Hutchinson | |
| 2017/0340265 A1* | 11/2017 | Shen | A61H 19/32 |
| 2018/0125748 A1* | 5/2018 | Goldenberg | A61H 23/0218 |

* cited by examiner

ACCESSORY FOR ADULT TOY, AND SYSTEM AND METHOD FOR PROVIDING ADULT ENTERTAINMENT IMPLEMENTING ADULT TOY

TECHNICAL FIELD

The present disclosure generally relates to system and method for interactive online adult entertainment, and particularly relates to an accessory for an adult toy to be implemented during a session of the interactive online adult entertainment to provide visual indication about status thereof.

BACKGROUND

Broadcast platforms providing chat rooms are widely used to allow two or more users usually located at different locations to communicate. Generally, chat rooms utilize text input by the users that can be displayed in real-time for providing a written transcript of a conversation. Some chat rooms incorporate video and audio so that two or more users can view some or all of the users from different locations in real-time while conversing. Some forms of chatting provide adult content to provide entertainment for adults. The adult entertainment has flourished in the online environment offered by the internet. Adult entertainment industry is constantly looking for innovative methods and apparatus that can bring additional adult thrill seekers together, to build community among those people, and to subsequently increase incremental revenue and customer loyalty. Current challenge for adult chat rooms is to provide the right kinds of interactivity and real-world features to provide enjoyable experiences to users and can therefore be attractive to a large number and wide range of users.

One implementation of the adult chat rooms is wherein a model may perform sexual stimulation on her (or his) body to be video streamed for entertainment of one or more viewers. Often, the sexual stimulation may be achieved by using one or more adult toys. For the purpose of attracting viewer's attention, models may be willing to use some adult toys having vibration feature to make their show more attractive. In some cases, the viewer may even send tips (a certain kind of reward on broadcast platform) to actuate model's toy to vibrate. By sending the tip, the viewer expects that the model shall insert the vibrating toy into her (or his) body. However, known remote vibrating adult toys do not provide any information about the status thereof and the status of the stimulation to the model that may be using the remote adult toy. Therefore, the viewer (i.e. customer who has sent tips) may not be sure about whether the toy is vibrating or not by just watching video stream of the performance of the model.

Therefore, it is desirable to develop new accessories, systems, and methods that can provide feedback of the stimulations and the status of the adult toy to inform the viewer.

SUMMARY OF THE EMBODIMENTS

In an aspect of the present disclosure, an accessory for an adult toy is provided. Herein, the adult toy has a vibration motor and a controller configured to actuate the vibration motor by generating an actuation signal. The accessory comprises a body adapted to be mounted on the adult toy. The accessory also comprises a light source arranged inside the body. The accessory further comprises a control circuit. The control circuit is configured to control the light source upon actuation of the vibration motor by the controller.

In one or more embodiments, the control circuit is disposed in operative communication with the controller in the adult toy to receive the actuation signal generated thereby. The control circuit is configured to control the light source upon receiving the actuation signal.

In one or more embodiments, the accessory further comprises a vibration sensor configured to sense the actuation of the vibration motor in the adult toy. Herein, the control circuit is configured to control the light source upon sensing of the actuation of the vibration motor in the adult toy by the vibration sensor.

In one or more embodiments, the accessory further comprises a power module configured to provide electric power for powering at least the light source therein.

In one embodiment, the power module is adapted to be electrically connected with a power source of the adult toy to withdraw the electric power therefrom.

In another embodiment, the power module comprises an electric battery to provide the electric power.

In one or more embodiments, the light source comprises one or more light emitting diodes (LEDs).

In one or more embodiments, the control circuit is a flexible printed circuit board. Further, the one or more LEDs are formed on the flexible printed circuit board.

In one or more embodiments, the control circuit is configured to control pulsation of the light source based, at least in part, on intensity of vibration generated by the vibration motor in the adult toy.

In one or more embodiments, the body is annular shaped elastic split-body.

In one or more embodiments, the body is substantially transparent.

In one or more embodiments, the accessory is formed integral to the adult toy.

In another aspect of the present disclosure, a system for providing adult entertainment is provided. The system comprises a broadcast platform configured to video stream a performance of a user accessible to at least one viewer. The broadcast platform provides an online chat room to allow for communication between the at least one viewer and the user. The system also comprises an adult toy to be implemented by the user in the performance thereof. The adult toy has a vibration motor and a controller configured to actuate the vibration motor by generating an actuation signal. The system also comprises a transceiver associated with adult toy and disposed in signal communication with the controller thereof. The transceiver is configured to receive a command signal in response to a predefined action by the at least one viewer and to instruct the controller to generate the actuation signal thereby upon receiving the command signal. The system further comprises an accessory. The accessory comprises a body adapted to be mounted on the adult toy. The accessory also comprises a light source arranged inside the body. The accessory further comprises a control circuit. The control circuit is configured to control the light source upon actuation of the vibration motor by the controller to provide a visual indication thereof, via the video stream, for perusal of the at least one viewer.

In one or more embodiments, the predefined action by the at least one viewer is sending a tip in the form of a digital currency to the user.

In one or more embodiments, the system further comprises a viewer computing device having a software application to enable the at least one viewer to access the broadcast platform and send the tip therefrom. The system also comprises a viewer display associated with the viewer computing device. The software application is configured to display a count-down timer on the viewer display for perusal of the viewer upon sending of the tip thereby. Herein, a time period of the count-down timer is directly proportional to amount of the tip sent by the viewer.

In one or more embodiments, the system further comprises a user computing device having a software application to enable the user to access the broadcast platform. The system also comprises a camera configured to record video of the performance of the user and connected to the user computing device for video streaming of the recorded video and a user display associated with the computing device. The software application is configured to display a confirmation for perusal of the user upon receiving of the tip by the at least one viewer on the user display. The software application is further configured to generate the command signal, to be received by the transceiver, upon receiving of the tip by the at least one viewer. Herein, the command signal instructs the controller to actuate the vibration motor for the time period of the count-down timer.

In yet another aspect of the present disclosure, a method for providing adult entertainment is provided. The method uses using an adult toy having a vibration motor, a light source and a controller configured to actuate the vibration motor by generating an actuation signal. The method comprises video streaming a performance of a user implementing the adult toy and accessible to at least one viewer. The method further comprises receiving a command signal in response to a predefined action by the at least one viewer. The method further comprises generating the actuation signal upon receiving the command signal. The method further comprises controlling the light source upon actuation of the vibration motor to provide a visual indication thereof, via the video stream, for perusal of the at least one viewer.

In one or more embodiments, the predefined action by the at least one viewer is sending a tip in the form of a digital currency to the user.

In one or more embodiments, the method further comprises displaying a count-down timer for perusal of the viewer upon sending of the tip thereby. Herein, a time period of the count-down timer is directly proportional to amount of the tip sent by the viewer. Further, herein, the command signal instructs the controller to actuate the vibration motor for the time period of the count-down timer.

Other aspects and example embodiments are provided in the drawings and the detailed description that follows.

BRIEF DESCRIPTION OF DRAWINGS

For a more complete understanding of example embodiments of the present technology, reference is now made to the following descriptions taken in connection with the accompanying drawings in which.

The drawings referred to in this description are only exemplary in nature and shall not be construed as limiting the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure can be practiced with details other than these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It is to be appreciated that determinations or inferences referenced throughout the present disclosure can be practiced through the use of computing techniques. In this regard, some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Figure 1:
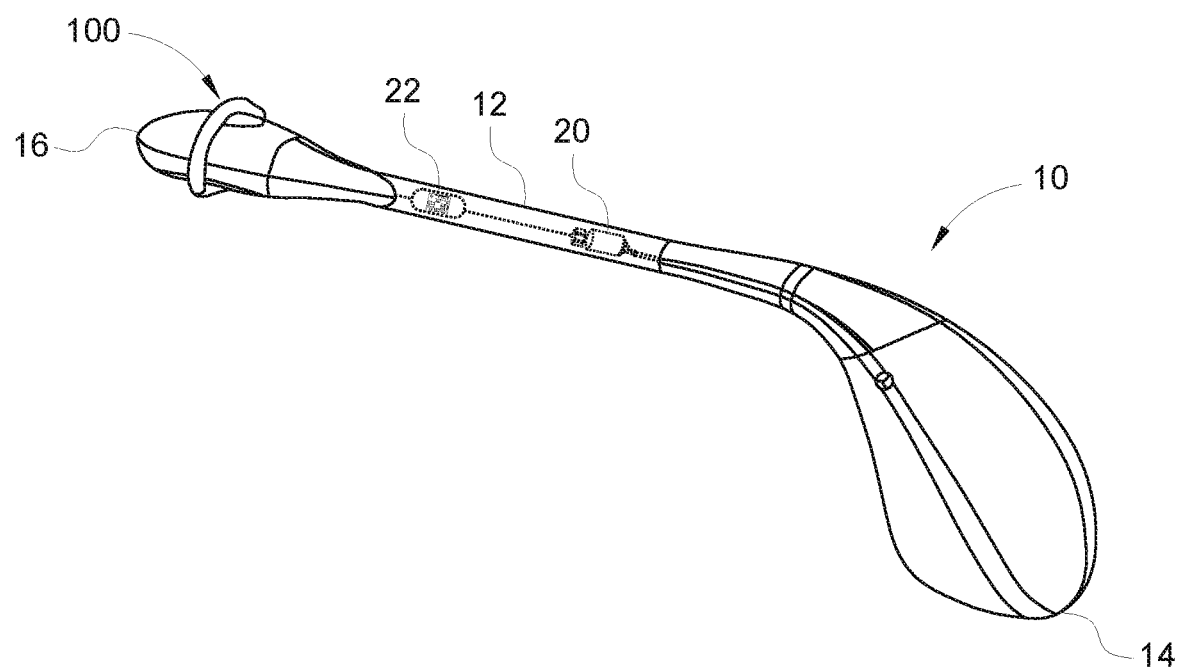
FIG. 1 illustrates a diagrammatic perspective view of an adult toy with an accessory mounted thereon, in accordance with one or more embodiments of the present disclosure.
Figure 2:
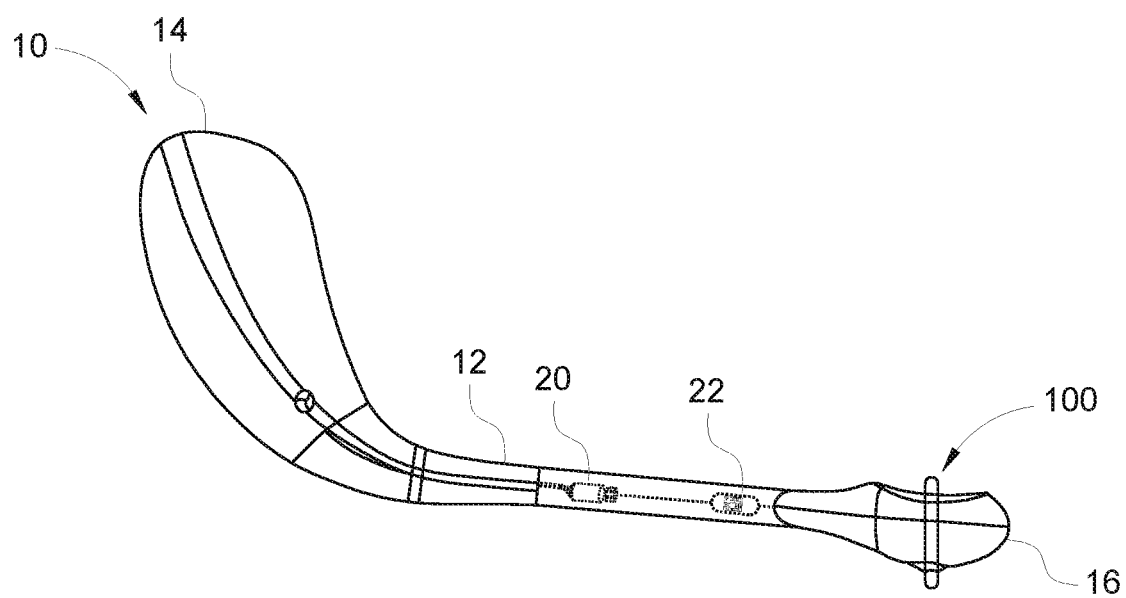
FIG. 2 illustrates a diagrammatic planar view of the adult toy of FIG. 1 with the accessory mounted thereon, in accordance with one or more embodiments of the present disclosure.

Referring to FIGS. 1-2 in combination, illustrated are diagrammatic views of an adult toy (generally referred by the numeral 10), in accordance with one or more embodiments of the present disclosure. The adult toy 10, which is sometimes also referred to as sex toy, is generally a personal vibrator, also known variously as vibrator, massager, vibrating massager, dildo and by numerous other names. The adult toy 10 can come in a variety of configurations and perform a variety of functions, ranging from medical therapy to erotic stimulation. The adult toy 10 can provide different types of stimulations, such as vibrational stimulation, motion stimulation, force stimulation, electric stimulation, friction stimulation, and/or other types of stimulation to a user. In some examples, the adult toy 10 can provide a sensory feedback to a user to indicate the real time strength, pattern, and other status information of the stimulations. The sensory feedback can be audio feedback and/or haptic feedback to the user.

In present examples, the adult toy 10 can include any number of adult entertainment devices. As discussed, the adult toy 10 could comprise a vibrator, dildo, massager, or similar device. In general, the adult toy 10 should have at least one operative functionality that can be altered, such as a vibrating function, a rotational function, an extending function, or the like. Such operational features are known in the art, and the adult toy 10 of the present invention can incorporate any such functionality, as long as the activation of or degree of activation can be controlled. The operation of the functionality of the adult toy 10 can be altered either manually using, e.g., control dial or the like, or remotely using receiver, as discussed below.

As illustrated, the adult toy 10 has a housing 12 for containing various components thereof. The housing 12 may be made of any non-toxic and skin-safe material, such as plastic like low density polyethylene (LDPE). In general, the housing 12 is substantially cylindrical in shape. In many examples, the housing 12 may be hermetically sealed along the joint formed between the two halves using, for example, ultrasonic welding. The adult toy 10 includes a vibration motor 20 located inside the housing 12. In one example, the vibration motor 20 may be a variable motor to provide different intensity of vibrations for the adult toy 10. In other examples, the adult toy 10 may include more than one vibration motor 20, for instance two motors, one preferably large and one preferably small, included within housing 12 to provide different intensity of vibrations for the adult toy 10.

For purposes of the present disclosure, the adult toy 10 includes a controller 22. The controller 22 is configured to actuate the vibration motor 20 by generating an actuation signal, to cause the vibration motor 20 to generate vibration and thereby result in vibration of the adult toy 10. Herein, the controller 22 may be any processing device, system or part thereof that controls at least one operation of the adult toy 10. The controller 22 may be implemented in hardware, firmware or software, or some combination of at least two of the same. It should be noted that the functionality associated with any particular controller may be centralized or distributed, whether locally or remotely. The controller 22 may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. Further, the memory may include one or more non-transitory computer-readable storage media that can be read or accessed by other components in the device. The memory may be any computer-readable storage media, including volatile and/or non-volatile storage components, such as optical, magnetic, organic or other memory or disc storage, which can be integrated in whole or in part with the device. In some examples, the memory may be implemented using a single physical device (e.g., one optical, magnetic, organic or other memory or disc storage unit), while in other embodiments, the memory may be implemented using two or more physical devices.

Embodiments of the present disclosure relates to an accessory for an adult toy, such as the adult toy 10. As illustrated in FIGS. 1-2, an accessory (generally referred by the numeral 100) is associated with the adult toy 10. In one or more embodiments of the present disclosure, the accessory 100 is an independent component which may be fitted or attached to the adult toy 10. It is to be noted that for sexual stimulation, in one instance, the adult toy 10 is meant to be inserted into genital part of human body or the like. Herein, the housing 12 has a first end 14 and a second end 16, with the first end 14 of the housing 12 is meant to be inserted into the human body for achieving sexual stimulation using the adult toy 10. As illustrated herein, the accessory 100 is located towards the second end 16 of the housing 12, when mounted onto the adult toy 10. In the present embodiments, the accessory 100 is shown to be removably mounted onto the adult toy 10; however, in other examples, the accessory 100 may be integrally formed with the adult toy 10 without departing from the scope and the spirit of the present disclosure.

Figure 3B:
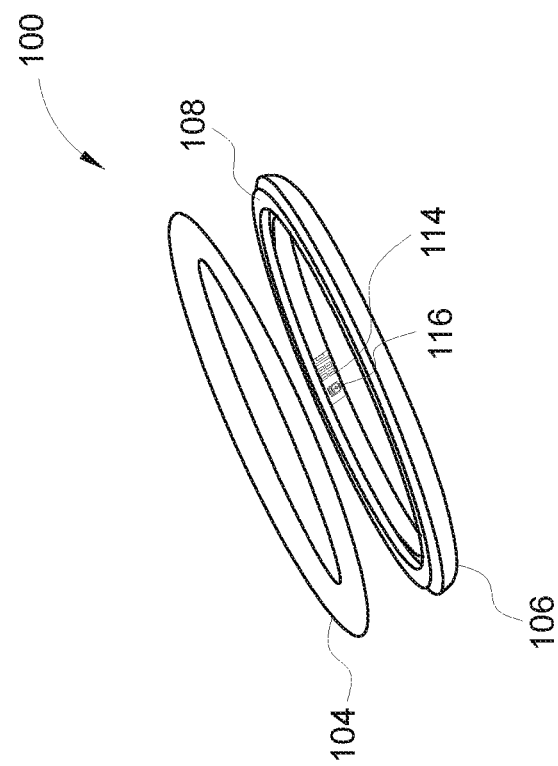
FIG. 3B illustrates a diagrammatic exploded view of the accessory of FIG. 3A, in accordance with one or more embodiments of the present disclosure.
Figure 3A:
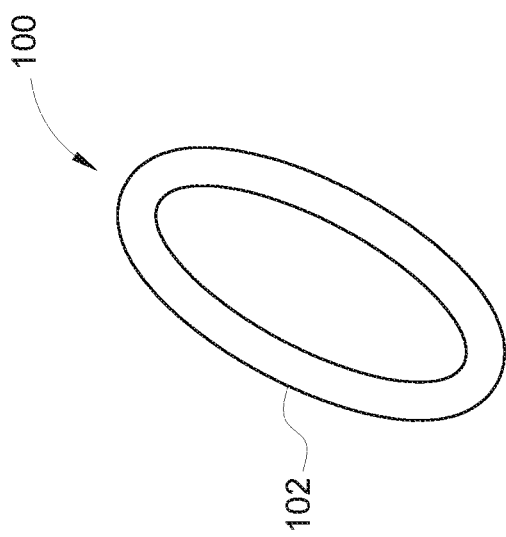
FIG. 3A illustrates a diagrammatic perspective view of the accessory of FIG. 1, in accordance with one or more embodiments of the present disclosure.

FIG. 3A illustrates a diagrammatic perspective view of the accessory 100, and FIG. 3B illustrates a diagrammatic exploded view of the accessory 100 showing internal components thereof. As illustrated, the accessory 100 includes a body 102. The body 102 is shaped and adapted to be mounted onto the adult toy 10. In the present examples, the body 102 is annular shaped structure. Further, the body 102 is made of elastic material, such that the body 102 may be easily fitted onto the cross-sectional shape of the housing 12 of the adult toy 10 and conforms thereto. As illustrated particularly in FIG. 3B, the body 102 is a split-body; that is, the body 102 is made of two annular halves 104 and 106. Herein, the two halves 104 and 106 may be joined together at their seams using some form of locking mechanism, such as a clasping lock or use of fastener or the like which may be contemplated by a person skilled in the art and thus has not been described herein.

Figure 5:
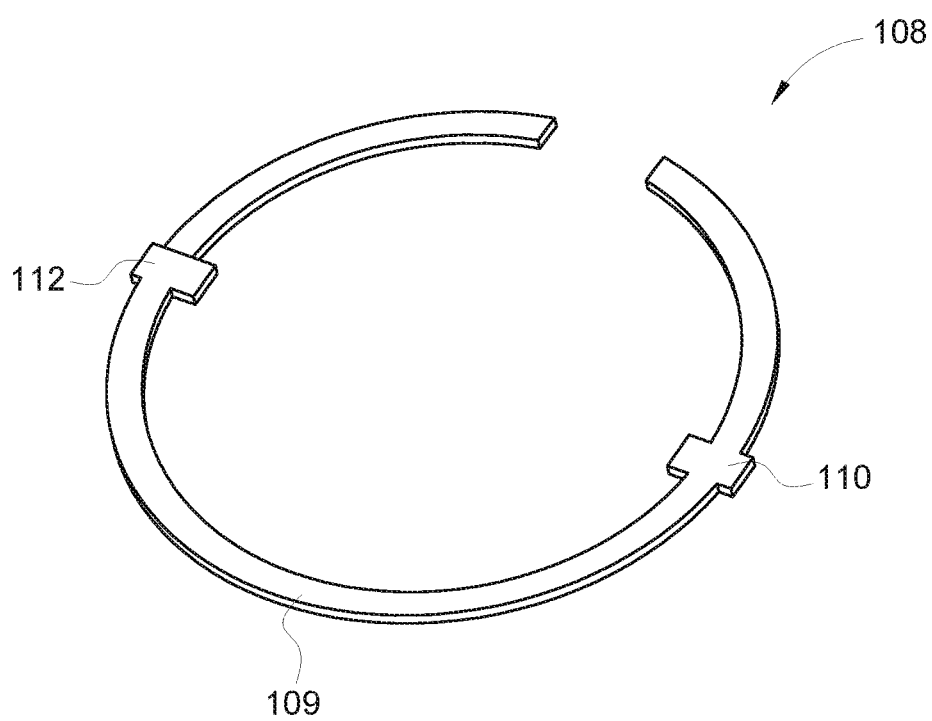
FIG. 5 illustrates a diagrammatic detailed view of a control circuit of the accessory (as shown in FIG. 3B), in accordance with one or more embodiments of the present disclosure.

Further as illustrated better in FIG. 3B, the accessory 100 includes a control circuit 108. In the illustrated examples, the control circuit 108 includes a printed circuit board (PCB) 109, generally shaped as an annular ring and is flexible to be accommodated inside the body 102. FIG. 5 illustrates a diagrammatic perspective view of the control circuit 108 of the accessory 100, shown as a flexible PCB 109. The term "control circuit", as used herein, designates any electronic device or fraction thereof comprising printed elements, i.e. elements obtained by deposition of electronic ink on a paper-based substrate by a printing method, the function of such printed elements being achieved through their topological arrangement, generated by the printing step. In particular, at least part of the electronic circuit is intimately adsorbed on the printing surface and these parts have very little if any mechanical cohesion independently of the paper substrate. As disclosed in more detail below, such an electronic circuit may also comprise non-printed components (or elements). The terms "electronic circuit", or simply "circuit", are sometimes used herein alone and conveys the same meaning as "control circuit".

Further, the accessory 100 includes a light source 110 arranged inside the body 102. The light source 110 may include one or more light units, and the one or more light units are one of a light emitting diode (LED), a halogen lamp, an incandescent bulb, a fluorescent light bulb, a metal halide lamp and a sodium lamp. Preferably, the light source 110 comprises one or more LEDs. In the present examples, with the control circuit 108 being the PCB 109, the one or more LEDs of the light source 110 are formed (e.g. printed) on the flexible PCB (as shown). It may be appreciated that the body 102 of the accessory 100 is substantially transparent (i.e. made of substantially transparent material) to allow for light emitted by the light source 110 arranged inside thereof to pass therethrough and provide a visual stimulus from the accessory 100. Any suitable transparent material may be used for forming the body 102 of the accessory 100 without any limitations.

In some embodiment, as illustrated in FIG. 3B, the accessory 100 further includes a vibration sensor 112. In the present examples, as illustrated, the vibration sensor 112 may be formed (e.g. printed) on the flexible PCB 109 (as shown) of the control circuit 108. Generally, as known in the art, the vibration sensors are implemented for measuring, displaying, and analyzing linear velocity, displacement and proximity, or acceleration. Herein, the vibration sensor 112 is configured to sense the actuation of the vibration motor in the adult toy 10 when the accessory is mounted onto the housing 12 of the adult toy 10. It may be appreciated that the vibration sensor may detect vibrating movements of the housing 12 to detect when the vibration motor is actuated. Herein, the vibration sensor 112 may be one of, but not limited to, accelerometer, gyroscope, eddy current meter, capacitive displacement meter and the like.

Figure 4:
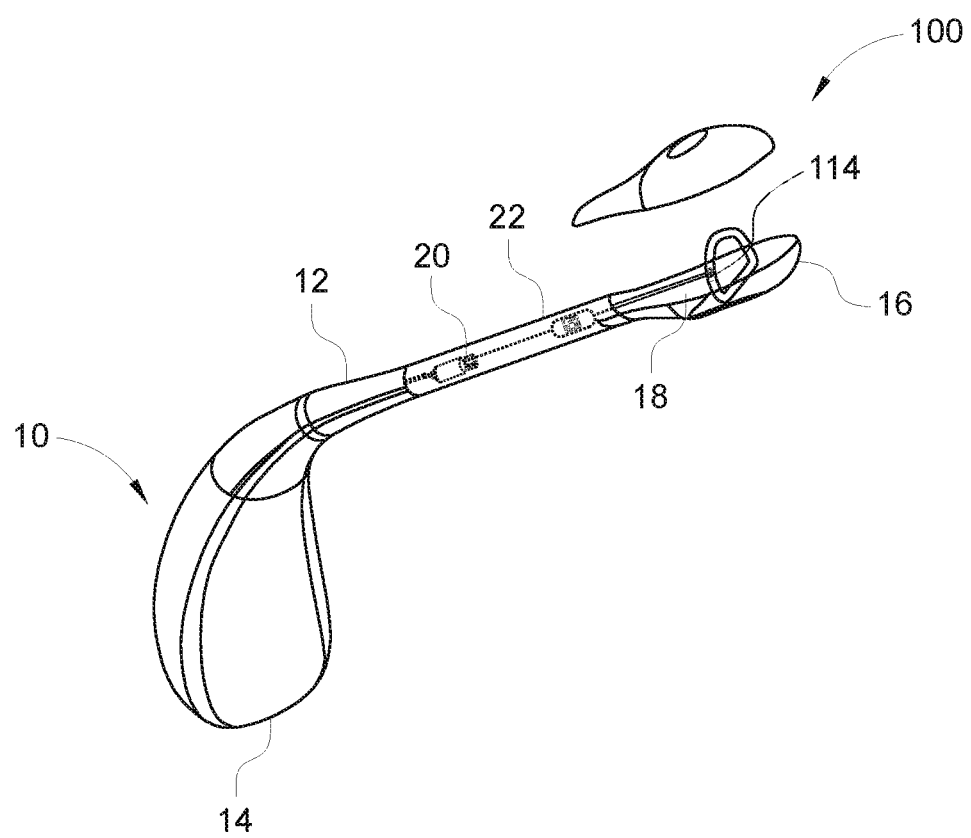
FIG. 4 illustrates a diagrammatic perspective view of the adult toy of FIG. 1 depicting mounting of the accessory thereon, in accordance with one or more embodiments of the present disclosure.

Furthermore, as illustrated in FIG. 3B, the accessory 100 includes a power module 114. The power module 114 is configured to provide electric power for powering the various components of the accessory 100, such as at least the light source 110 as well as the vibration sensor 112 in some cases. In one embodiment, the power module 114 is adapted to be electrically connected with a power source of the adult toy 10 to withdraw the electric power therefrom. For instance, FIG. 4 illustrates a diagrammatic perspective view depicting mounting of the accessory 100 onto the adult toy 10, in accordance with one or more embodiments of the present disclosure. As may be seen, the accessory 100, or specifically the power module 114 thereof, may be electrically connected to a power source 18, such as a rechargeable battery, which can be a lithium ion battery, secured within housing 12, of the adult toy 10. For this purpose, a cover in the housing 12 placed over the power source 18 is first removed, the power module 114 is electrically connected to the power source 18 and then the cover may be placed back to close the housing 12 again. It may be appreciated that the illustration is exemplary only and shall not be construed as limiting to the disclosure in any manner. In an alternate embodiment, the power module 114 may be independent and may include an electric battery 116 (such as, a rechargeable battery, which can be a lithium ion battery) to provide the required electric power for operation of the accessory 100. In some examples, the power module 114 may utilize conventional alternating current electricity from a wired electric connection with a power cord or the like.

According to embodiments of the present disclosure, the control circuit 108 is configured to control the light source 110 upon actuation of the vibration motor by the controller of the adult toy 10. In one implementation, the control circuit 108 is disposed in operative communication with the controller in the adult toy 10 to receive the actuation signal generated thereby. Further, herein, the control circuit 108 is configured to control the light source 110 upon receiving the actuation signal. In another implementation, the control circuit 108 is configured to control the light source 110 upon sensing of the actuation of the vibration motor in the adult toy 10 by the vibration sensor 112. It may be appreciated that in some implementations the control circuit 108 may employ a combination of techniques of receipt of the actuation signal and sensing of the actuation of the vibration motor in order to control the light source 110 for better reliability. In the present embodiments, the control circuit 108 is configured to control pulsation of the light source 110 based, at least in part, on intensity of vibration generated by the vibration motor in the adult toy 10. Thus, the light source 110 may flash or twinkle to provide a visual indication as a validation of operation of the adult toy 10 for external viewer, as discussed below.

Further, the present disclosure relates to systems and method for providing adult entertainment using the adult toy 10 with the accessory 100 (as described above), details of which are provided in the subsequent paragraphs. As used herein, the terms such as "user," "users," "end user," "end users," "viewer," "viewers," "audience," "client," "clients," "customer," and "customers" are interchangeable unless the context clearly suggests otherwise. Similarly, as used herein, the terms "model," "models," "performer," "performers," are used interchangeably unless the context clearly suggests otherwise. The terms "web browser extension," "browser extension," and "website" are used interchangeably unless the context clearly suggests otherwise. Furthermore, the foregoing terms "web browser extension," "browser extension," and "website" may be collectively referred to as "application," "software," or "software application." Further as used in the present disclosure, the terms "component," "module," "system," "interface," or the like are generally intended to refer to a computer-related entity, either hardware or a combination of hardware and software. For example, a component can be, but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Some embodiments of the present system and method may include one or more wired or wireless links, may utilize one or more components of wireless communication, may utilize one or more methods or protocols of wireless communication, or the like. Some embodiments may utilize wired communication and/or wireless communication. Some embodiments may be used in conjunction with various devices and systems, for example, a personal computer (PC), a desktop computer, a mobile computer, a laptop, a tablet computer, a server computer, a handheld device, a personal digital assistant (PDA), a wireless communication device, a smart phone, a non-portable device, a wireless access point (AP), a wired or wireless router, a wired or wireless modem, a wired or wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), or networks operating in accordance with existing and/or future versions and/or derivatives of long term evolution (LTE), a device which incorporates a global positioning system (GPS) receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, or the like.

Figure 6:
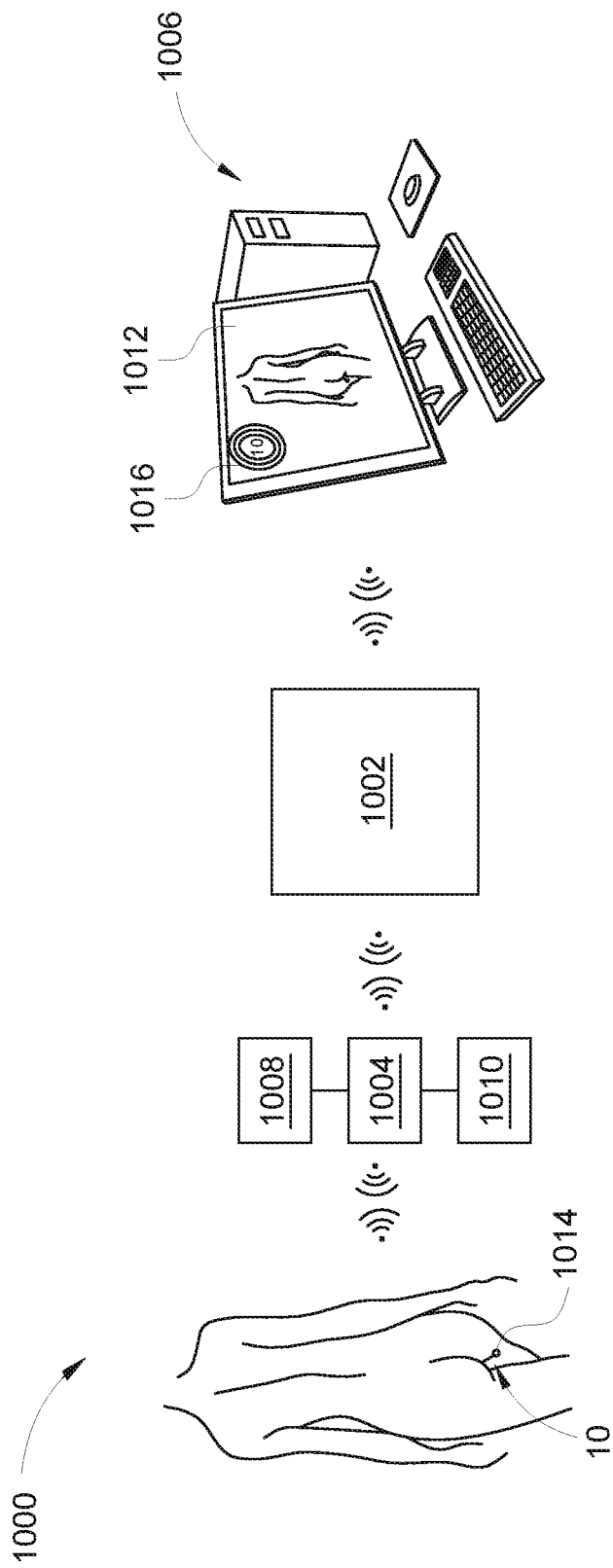
FIG. 6 illustrates a schematic block diagram of a system for providing adult entertainment using the adult device with the accessory of FIG. 1, in accordance with one or more embodiments of the present disclosure.

Referring now to FIG. 6, illustrated is a high-level schematic block diagram of a system 1000 for providing adult entertainment, in accordance with one or more embodiments of the present disclosure. The system 1000 comprises a broadcast platform 1002. The broadcast platform 1002 provides a website with an online chat room to allow for communication between one or more viewers and a user. Herein, the user may be a model (hereinafter, the two terms have been interchangeably used) who may enact a sexual stimulation performance for entertainment of the viewer. The user may implement an adult toy (such as, the adult toy 10) with the accessory 100 mounted thereunto in the performance thereof. The broadcast platform 1002 is configured to video stream a performance of the user accessible to the at least one viewer. In the present examples, the broadcast platform 1002 may be an OBS (Open Broadcaster Software) module, which is well known and widely utilized in the art, and thus has not been described herein for the brevity of the present disclosure. It is noted that as used herein, the terms "performance," "performances," "act," and "acts" mean the model's performances, the model's use of the adult toy 10 and/or the operation of the adult toy 10 (e.g., vibrating, rotating, thrusting, oscillating, etc.).

In particular, the broadcast platform 1002 is configured to allow the user and the viewer to set up a user account and a viewer account, respectively. In this regard, the user can create a model account by inputting the model's name, age, gender, location, and the like. Similarly, the viewer can create his or her user name and password and input payment information, among other types of information associated with the user. The user account information and the viewer account information are stored in a database that is connected to the network of the present system.

Further, the system 1000 includes a user computing device 1004 having a software application to enable the user to access the broadcast platform 1002. The user computing device 1004 is operated by the user. The system also includes a viewer computing device 1006 having a software application to enable the viewer to access the broadcast platform 1002. The viewer computing device 1006 is operated by the viewer. The user computing device 1004 and the viewer computing device 1006 include a variety of computer systems and/or a terminal, for example, desktop computer, laptop computer, mobile phone, tablet, PDA, etc., that allow the user to access the web browser on which the respective user and the viewer can access the online chat room to engage in an online chat with each other, via the broadcast platform 1002. In this regard, the user computing device 1004 and the viewer computing device 1006 may be implemented using suitable hardware components and/or software components, for example, processors, controllers, memory units, storage units, input units, output units, communication units, operating systems, applications, or the like.

Herein, the software application may be a non-downloadable or downloadable mobile application, web application, or the like, stored on the user computing device 1004 and communicates with the adult toy 10 so as to send command signals thereto. It is contemplated that the software application may have a UI for manually controlling the adult toy 10, for example, by transmitting command signals to turn the adult toy 10 on and off. In present embodiments, it is contemplated that the adult toy 10 is Wi-Fi or Bluetooth™ enabled (or enabled via other suitable short-range wireless communication standard) so as to allow the adult toy 10 to directly communicate with the software application (e.g. web browser extension) via the user computing device 1004 and receive commands therefrom. In this regard, the adult toy 10 is configured to receive signals from the user computing device 1004 and/or the web browser installed therein.

Figure 7:
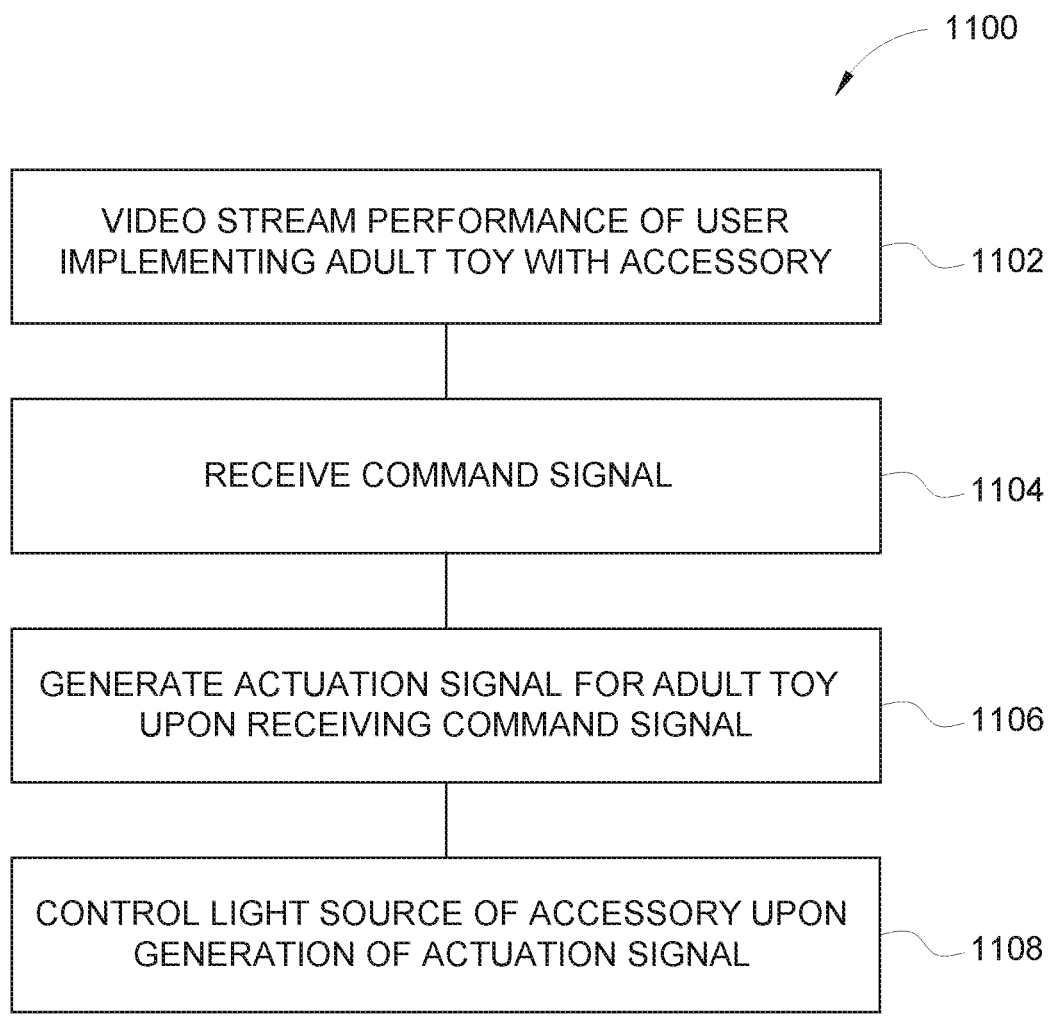
FIG. 7 illustrates a flowchart depicting steps involved in a method for providing adult entertainment using the adult device with the accessory of FIG. 1, in accordance with one or more embodiments of the present disclosure.

As schematically illustrated in FIG. 6, the system 1000 includes a camera 1008 configured to record video of the performance of the user. The camera 1008 is connected to the user computing device 1004 for video streaming of the recorded video, via the broadcast platform 1002. Also, as shown, the system 1000 includes a user display 1010 associated with the user computing device 1004. Further, as schematically illustrated in FIG. 7, the system 1000 includes a viewer display 1012 associated with the viewer computing device 1006.

The system 1000 further includes a transceiver 1014 associated with adult toy 10 and disposed in signal communication with the controller thereof. The transceiver 1014 is configured to receive a command signal in response to a predefined action by the at least one viewer and to instruct the controller to generate the actuation signal thereby upon receiving the command signal. The transceiver implements a wireless communication standard, such as Wi-Fi or Bluetooth™, for receiving the command signal. It may be understood that herein the control circuit 108 of the accessory 100 is configured to control the light source 110 therein upon actuation of the vibration motor by the controller to provide a visual indication thereof, via the video stream, for perusal of the at least one viewer (as discussed in more detail in the proceeding paragraphs).

In the present embodiments, the predefined action by the at least one viewer is sending a tip in the form of a digital currency (such as, a token) to the user. Via the broadcast platform 1002, the viewer can select a user (i.e. a model) from a group of models to enter into an online chat session, via the website. In this regard, the chat session can be a private (i.e., one-on-one) session, a group session (i.e., limited number of users and one model), or a public session (i.e., unlimited number of users). In one embodiment, the broadcast platform 1002 allows the model to designate specific tip amounts and/or ranges of tip amounts and performance correlating to each of the tip amounts and/or ranges. In this regard, the broadcast platform 1002 is configured to recognize tip amounts and send command signal to the adult toy 10 (received by the transceiver 1014 associated therewith) either directly (if the adult toy is Wi-Fi enabled) or via the software application installed on the user computing device 1004 (which is connected to the adult toy 10). The software application is configured to generate the command signal, to be received by the transceiver 1014, upon receiving of the tip by the at least one viewer. If the broadcast platform 1002 and/or the software application (e.g., web browser extension) determines that the received tip falls within one of the tip parameters, it actuates the adult toy 10 in accordance with the tip amount. For example, the model can set tip parameters such that tip amounts between 1 to 10 tokens may cause the adult toy 10 to vibrate for 30 seconds, and tip amounts between 11 to 20 tokens may cause the adult toy 10 to vibrate for 100 seconds. Herein, the software application is configured to display the tip parameters. Herein, the software application is configured to display a count-down timer 1016 on the viewer display 1012 for perusal of the viewer upon sending of the tip thereby. A time period of the count-down timer is determined which is directly proportional to amount of the tip sent by the viewer and is equivalent to the time period of vibration of the adult toy 10 (as discussed above). In other words, the command signal instructs the controller to actuate the vibration motor of the adult toy 10 for the time period of the count-down timer. For instance, if the adult toy 10 is going to vibrate for 10 seconds, the software application may generate sequential labels for the countdown time as 10, 9, 8, 7, 6, 5, 4, 3, 2, 1. It may be appreciated that the countdown timer let the viewer be familiar with the status of the adult toy 10. Further, the software application is also configured to display a confirmation for perusal of the user upon receiving of the tip by the at least one viewer on the user display 1010. It is contemplated that the received tip amounts are credited to the user's (model's) account and made redeemable by the respective user at a later time.

The present disclosure further provides a method for providing adult entertainment using an adult toy (such as, the adult toy 10). FIG. 7 illustrates a flowchart 1100 depicting steps involved in the said method for providing adult entertainment using the adult toy 10. At step 1102, the method includes video streaming a performance of a user implementing the adult toy and accessible to at least one viewer. At step 1104, the method includes receiving a command signal in response to a predefined action by the at least one viewer. Herein, the predefined action by the at least one viewer is sending a tip in the form of a digital currency to the user. At step 1106, the method includes generating the actuation signal upon receiving the command signal. The method further includes displaying a count-down timer 1016 for perusal of the viewer upon sending of the tip thereby. A time period of the count-down timer 1016 is directly proportional to amount of the tip sent by the viewer. Further, the command signal instructs the controller to actuate the vibration motor for the time period of the count-down timer 1016. At step 1108, the method includes controlling the light source 110 upon actuation of the vibration motor to provide a visual indication thereof, via the video stream, for perusal of the at least one viewer. In other words, the light source 110 is controlled upon generation of the actuation signal. At completion of the time period, it is checked if a further tip has been received. If yes, another command signal is received, otherwise the vibration motor of the adult toy 10 is stopped.

It is to be noted that the adult toy industry is one of the largest and most successful aspects of adult entertainment today. As technology has developed further, convergence of adult toys and wireless communications has led to remote controllable adult toys. Early on, remote control of a sex toy required that the sex toy and the remote controller be generally in the same vicinity, e.g., in the same room. However, as networking technologies became more common place and sophisticated, remote control sex toys can be accessed at great distances via the internet, or other data networks. With the present adult toy 10, the accessory 100, the system 1000 and the method 1100, the viewer (e.g., a customer) who has sent tips to a user (e.g., a model) for a performance involving the adult toy 10 is provided with a visual indication that during the performance, the adult toy 10 which the model is actually using is vibrating, and can thereby provide feedback of the stimulations and the status of the adult toy 10 for perusal of the viewer.

The benefits and advantages described above may relate to one embodiment or may relate to several embodiments. The embodiments are not limited to those that solve any or all of the stated problems or those that have any or all of the stated benefits and advantages.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An accessory for an adult toy having a vibration motor and a controller configured to actuate the vibration motor by generating an actuation signal, the accessory comprising:
   a body adapted to be mounted on the adult toy, wherein the body is annular shaped and elastic;
   a light source arranged inside the body;
   a control circuit, wherein the control circuit is configured to control the light source upon actuation of the vibration motor by the controller; and
   a power module present inside the body, wherein the power module is configured to power at least the light source therein, wherein the power module present inside the body of the accessory is different from a power source of the adult toy, and wherein the accessory is configured to be located towards a part of the adult toy which is not inserted into the human body.

2. The accessory as claimed in claim 1, wherein the control circuit is disposed in operative communication with the controller in the adult toy to receive the actuation signal generated thereby, and wherein the control circuit is configured to control the light source upon receiving the actuation signal.

3. The accessory as claimed in claim 1 further comprising a vibration sensor configured to sense the actuation of the vibration motor in the adult toy, and wherein the control circuit is configured to control the light source upon sensing of the actuation of the vibration motor in the adult toy by the vibration sensor.

4. The accessory as claimed in claim 1, wherein the light source comprises one or more light emitting diodes (LEDs).

5. The accessory as claimed in claim 4, wherein the control circuit is a flexible printed circuit board, and wherein the one or more LEDs are formed on the flexible printed circuit board.

6. The accessory as claimed in claim 1, wherein the control circuit is configured to control pulsation of the light source based, at least in part, on intensity of vibration generated by the vibration motor in the adult toy.

7. The accessory as claimed in claim 1, wherein the body is split-body.

8. The accessory as claimed in claim 1, wherein the body is substantially transparent.

9. The accessory as claimed in claim 1, wherein the accessory is formed integral to the adult toy.

10. A system for providing adult entertainment, comprising:

a broadcast platform configured to video stream a performance of a user accessible to at least one viewer, the broadcast platform providing an online chat room to allow for communication between the at least one viewer and the user;

an adult toy to be implemented by the user in the performance thereof, the adult toy comprising a vibration motor and a controller configured to actuate the vibration motor by generating an actuation signal;

a transceiver associated with adult toy and disposed in signal communication with the controller thereof, the transceiver configured to receive a command signal in response to a predefined action by the at least one viewer and to instruct the controller to generate the actuation signal thereby upon receiving the command signal; and an accessory configured to be located towards a part of the adult toy which is not inserted into the human body, the accessory comprising:
  a body adapted to be mounted on the adult toy, wherein the body is annular shaped and elastic;
  a light source arranged inside the body;
  a control circuit, wherein the control circuit is configured to control the light source upon actuation of the vibration motor by the controller to provide a visual indication thereof, via the video stream, for perusal of the at least one viewer; and
  a power module present inside the body, wherein the power module is configured to power at least the light source therein, and wherein the power module present inside the body of the accessory is different from a power source of the adult toy.

11. The system as claimed in claim 10, wherein the predefined action by the at least one viewer is sending a tip in the form of a digital currency to the user.

12. The system as claimed in claim 11 further comprising:
a viewer computing device having a software application to enable the at least one viewer to access the broadcast platform and send the tip therefrom;
a viewer display associated with the viewer computing device,
wherein the software application is configured to display a count-down timer on the viewer display for perusal of the viewer upon sending of the tip thereby, and wherein a time period of the count-down timer is directly proportional to amount of the tip sent by the viewer.

13. The system as claimed in claim 12 further comprising:
a user computing device having a software application to enable the user to access the broadcast platform;
a camera configured to record video of the performance of the user and connected to the user computing device for video streaming of the recorded video; and
a user display associated with the user computing device,
wherein the software application is configured to display a confirmation for perusal of the user upon receiving of the tip by the at least one viewer on the user display, and
wherein the software application is further configured to generate the command signal, to be received by the transceiver, upon receiving of the tip by the at least one viewer, wherein the command signal instructs the controller to actuate the vibration motor for the time period of the count-down timer.

14. The system as claimed in claim 11, wherein the transceiver implements a wireless communication standard for receiving the command signal.

15. A method for providing adult entertainment using an adult toy having a vibration motor, a light source and a controller configured to actuate the vibration motor by generating an actuation signal, comprising:
video streaming a performance of a user implementing the adult toy and accessible to at least one viewer;
receiving a command signal in response to a predefined action by the at least one viewer;
generating the actuation signal upon receiving the command signal; and
controlling the light source upon actuation of the vibration motor to provide a visual indication thereof, via the video stream, for perusal of the at least one viewer, wherein the light source is present inside an annular shaped elastic body removably mounted on the adult toy, wherein a power module present inside the annular shaped elastic body powers the light source, and wherein the power module present inside the annular shaped elastic body is different from a power source of the adult toy.

16. The method as claimed in claim 15, wherein the predefined action by the at least one viewer is sending a tip in the form of a digital currency to the user.

17. The method as claimed in claim 16 further comprising displaying a count-down timer for perusal of the viewer upon sending of the tip thereby, wherein a time period of the count-down timer is directly proportional to amount of the tip sent by the viewer, and wherein the command signal instructs the controller to actuate the vibration motor for the time period of the count-down timer.

* * * * *